(12) United States Patent
Lavin et al.

(10) Patent No.: US 12,535,937 B2
(45) Date of Patent: Jan. 27, 2026

(54) MERGE MENU DIRECTED INSPECTIONS FROM MULTIPLE BORESCOPE INSPECTIONS INTO A SINGLE INSPECTION AND REPORT

(71) Applicant: Baker Hughes Holdings LLC, Houston, TX (US)

(72) Inventors: Dennis Lavin, Syracuse, NY (US); Bryan Maule, Camillus, NY (US); Abigail Geaslin, Camillus, NY (US); Matthew Joseph Ryan, Syracuse, NY (US)

(73) Assignee: Baker Hughes Holdings LLC, Houston, TX (US)

( * ) Notice: Subject to any disclaimer, the term of this patent is extended or adjusted under 35 U.S.C. 154(b) by 241 days.

(21) Appl. No.: 18/528,401

(22) Filed: Dec. 4, 2023

(65) Prior Publication Data
US 2024/0192831 A1 Jun. 13, 2024

Related U.S. Application Data

(60) Provisional application No. 63/432,000, filed on Dec. 12, 2022.

(51) Int. Cl.
*G06F 3/0482* (2013.01)
*G02B 23/24* (2006.01)

(52) U.S. Cl.
CPC ....... *G06F 3/0482* (2013.01); *G02B 23/2484* (2013.01)

(58) Field of Classification Search
CPC .................................................... G06F 3/0482
USPC ........................................................ 715/810
See application file for complete search history.

(56) References Cited

U.S. PATENT DOCUMENTS

| 10,679,066 | B2* | 6/2020 | Pathak | G06F 18/2163 |
| 12,400,168 | B2* | 8/2025 | Kumar | G06Q 10/06375 |
| 2008/0065668 | A1* | 3/2008 | Spence | G06Q 10/06 |
| 2009/0216734 | A1* | 8/2009 | Aghajanyan | G06F 16/9535 |
| | | | | 707/999.005 |
| 2009/0292678 | A1* | 11/2009 | Kawanishi | G06F 40/174 |
| 2014/0139658 | A1* | 5/2014 | Dhanvantri | G01N 21/954 |
| | | | | 348/85 |

(Continued)

FOREIGN PATENT DOCUMENTS

KR 10-2022-0097700 A 7/2022

OTHER PUBLICATIONS

International Search Report; Issued Mar. 22, 2024; corresponding International Patent Application No. PCT/US2023/083119; 3 pages.

*Primary Examiner* — Reza Nabi
(74) *Attorney, Agent, or Firm* — Mintz, Levin, Cohn, Ferris, Glovsky and Popeo, P.C.

(57) ABSTRACT

In one aspect a system and method for merging inspections from multiple borescope inspections into a single inspection and report include receiving, within a graphical user interface (GUI) of a borescope device, a selection of a first inspection file including first data characterizing a first inspection of an asset, receiving, within the GUI, a selection of a second inspection file including second data characterizing a second inspection of the asset, determining that the first inspection file and the second inspection file may be compatible to be merged and generating, automatically, a merged inspection file the merged inspection file that includes the first data and the second data.

18 Claims, 12 Drawing Sheets

(56) References Cited

U.S. PATENT DOCUMENTS

| | | | |
|---|---|---|---|
| 2016/0012465 A1* | 1/2016 | Sharp | G06Q 20/321 |
| | | | 705/14.17 |
| 2020/0341648 A1* | 10/2020 | Zhao | G06F 3/0608 |
| 2021/0067741 A1* | 3/2021 | Yoshizawa | H04N 23/633 |
| 2021/0133928 A1* | 5/2021 | Ding | G06T 3/40 |
| 2023/0017592 A1* | 1/2023 | McCrackin | H04N 23/64 |
| 2023/0098440 A1* | 3/2023 | Hashizume | H04N 25/443 |
| | | | 348/169 |
| 2024/0104851 A1* | 3/2024 | Narayana | G06T 19/003 |
| 2024/0192831 A1* | 6/2024 | Lavin | G06F 3/0482 |

\* cited by examiner

FIG.6

MERGE MENU DIRECTED INSPECTIONS FROM MULTIPLE BORESCOPE INSPECTIONS INTO A SINGLE INSPECTION AND REPORT

RELATED APPLICATION

This application claims priority under 35 U.S.C. § 119(e) to U.S. Provisional Application No. 63/432,000 filed Dec. 12, 2022, the entire contents of which are hereby expressly incorporated by reference herein.

BACKGROUND

Inspection operations of industrial assets can be performed using video borescopes. These inspections can be executed using inspection templates to generate reports of the inspection operations. Traditionally, however, large inspections involving multiple inspections executed by multiple inspectors can only be manually combined, which is a long, tedious and error-prone process.

SUMMARY

In one aspect a method for merging inspections from multiple borescope inspections into a single inspection and report is provided. In some embodiments, the method can include receiving, within a graphical user interface (GUI) of a borescope device, a selection of a first inspection file including first data characterizing a first inspection of an asset. The method can also include receiving, within the GUI, a selection of a second inspection file including second data characterizing a second inspection of the asset, determining that the first inspection file and the second inspection file may be compatible to be merged and generating, automatically, a merged inspection file, where the merged inspection file includes the first data and the second data.

In some aspects, the method includes receiving, within the GUI, a selection of a merge button, prompting, within the GUI, a user to select the first inspection file and the second inspection file. In some aspects the first inspection file may be a first human-readable, machine-readable file and the first data includes a first inspection template including one or more first nodes corresponding to one or more first inspection points of the first inspection and the second inspection file may be a second human-readable, machine-readable file and the second data includes a second inspection template including one or more second nodes corresponding to one or more second inspection points of the second inspection.

In another aspect, the method includes determining whether the first inspection template matches the second inspection template, generating the merged inspection file responsive to determining that the first inspection template matches the second inspection template and providing an error notification to the GUI responsive to determining that the first inspection template does not match the second inspection template.

In some embodiments, the first inspection file may be stored within a first inspection folder including the first inspection file and one or more first files, each of the one or more files corresponding one of the one or more first inspection points, and the second inspection file may be stored within a second inspection folder including the second inspection file and one or more second files, each of the one or more second files corresponding to one of the one or more second inspection points. In this case, the method can further include generating a merged inspection folder including a merged inspection file, the one or more first files and the one or more second files.

In another embodiment, the one or more first files and the one or more second files includes at least one of an image file, a video file and a text file. In another aspect, the method includes determining whether one or more naming conflicts exist between a title of the one or more first files and a title of the one or more second files. Responsive to determining that a naming conflict exists between the title of one or more of the first files and the title of the one or more of the second files, the method includes modifying the title of at least one of the one or more first files and the one or more second files to resolve the conflict.

In some aspects, the first inspection folder includes a first inspection ID and the second inspection folder includes a second inspection ID, and the method further includes automatically naming the merged inspection folder based on the first inspection ID and the second inspection ID. In some aspects, the method includes generating a merged inspection report. The merged inspection report may be a text-based file including the contents of the merged inspection folder. The method can also include providing the merged inspection report to a user.

In another aspect, the method includes receiving, within the GUI, a selection of a third inspection file including third data characterizing a third inspection of the asset, determining that the third inspection file may be compatible to be merged with the first inspection file and the second inspection file, where the merged inspection file includes the third data.

In another aspect, a system for merging inspections from multiple borescope inspections into a single inspection and report is provided. In some embodiments, the system can include a user interface display (UI) and a computing system communicatively coupled to the UI and including at least one data processor and a memory storing instructions, which, when executed by the at least one processor, cause the at least one processor to perform operations. In some aspects, the operations performed by the processor include receiving, within a graphical user interface (GUI) of the UI, a selection of a first inspection file including first data characterizing a first inspection of an asset, receiving, within the GUI, a selection of a second inspection file including second data characterizing a second inspection of the asset, determining that the first inspection file and the second inspection file may be compatible to be merged and generating a merged inspection file including the first data and the second data.

In some aspects, the processor can further perform operations including receiving, within the GUI, a selection of a merge button, prompting, within the GUI, a user to select the first inspection file and the second inspection file. The first inspection file may be a first human-readable, machine-readable file and the first data includes a first inspection template including one or more first nodes corresponding to one or more first inspection points first inspection and the second inspection file may be a second human-readable, machine-readable file and the second data includes a second inspection template including one or more second nodes corresponding to one or more second inspection points of the second inspection.

In some aspects, the processor can further perform operations including determining whether the first inspection template matches the second inspection template, generating the merged inspection file responsive to determining that the first inspection template matches the second inspection template and providing an error notification to the GUI responsive to determining that the first inspection template does not match the second inspection template.

In some aspects, the first inspection file may be stored within the memory in a first inspection folder including the first inspection file and one or more first files, each of the one or more first files corresponding one of the one or more first inspection points, and the second inspection file may be stored within the memory in a second inspection folder including the second inspection file and one or more second files, each of the one or more second files corresponding to one of the one or more second inspection points, and the processor can further perform operations including generating a merged inspection folder including a merged inspection file, the one or more first files and the one or more second files.

In some embodiments, the one or more first files and the one or more second files includes at least one of an image file, a video file and a text file. In this case, the processor can further perform operations including determining whether one or more naming conflicts exist between a title of the one or more first files and a title of the one or more second files and responsive to determining that a naming conflict exists between the title of one or more of the first files and the title of the one or more of the second files, modifying the title of at least one of the one or more first files and the one or more second files to resolve the conflict.

In some aspects, the first inspection folder includes a first inspection ID and the second inspection folder includes a second inspection ID. In this case, the processor can further perform operations including automatically naming the merged inspection folder based on the first inspection ID and the second inspection ID.

In some aspects, the processor can further to perform operations including generating a merged inspection report, where the merged inspection report is a text-based file including the contents of the merged inspection folder and providing the merged inspection report to a user.

In some embodiments, the processor can further perform operations including receiving, within the GUI, a selection of a third inspection file including third data characterizing a third inspection of the asset and determining that the third inspection file may be compatible to be merged with the first inspection file and the second inspection file, where the merged inspection file includes the third data.

BRIEF DESCRIPTION OF THE DRAWINGS

FIG. 6 illustrates an exemplary embodiment of an Inspection Details GUI of the borescope system of FIG. 1 configured to enable a user to modify details of the merged inspection;

DETAILED DESCRIPTION

Borescopes can be used to inspect industrial assets. These inspections can make use of inspection templates to generate organized reports of the inspection operations. Traditionally, however, borescope systems lack a capability to automatically combine multiple inspections involving similar inspection templates executed by multiple inspectors, this having to resort to manually combining inspections, which is a long, tedious and error-prone process.

The systems and methods described herein address the aforementioned shortcomings. For example, one or more embodiments of the system herein can include an on-device tool for a borescope, capable of combining multiple large inspection operations and generating a unified report, automatically. The systems and methods described herein provide the ability to combine inspections from within the same borescope, as well as inspections from different borescopes.

The systems and methods described herein allows for multiple inspections, generated by multiple inspectors, to be combined into a single inspection having a comprehensive and unified report. Accordingly, the systems and methods described herein can advantageously reduce the manual effort that is required when gathering inspections by providing a menu directed inspection (MDI) merge tool as described herein. Additionally, the systems and methods described herein can create a single, unified report document with consistent data, including an inspection summary table, approved details, etc, while also addressing problems that arise with naming conflicts when merging files. Further, the systems and methods described herein can create a single, merged inspection that can be persisted for later re-examination.

Figure 1:
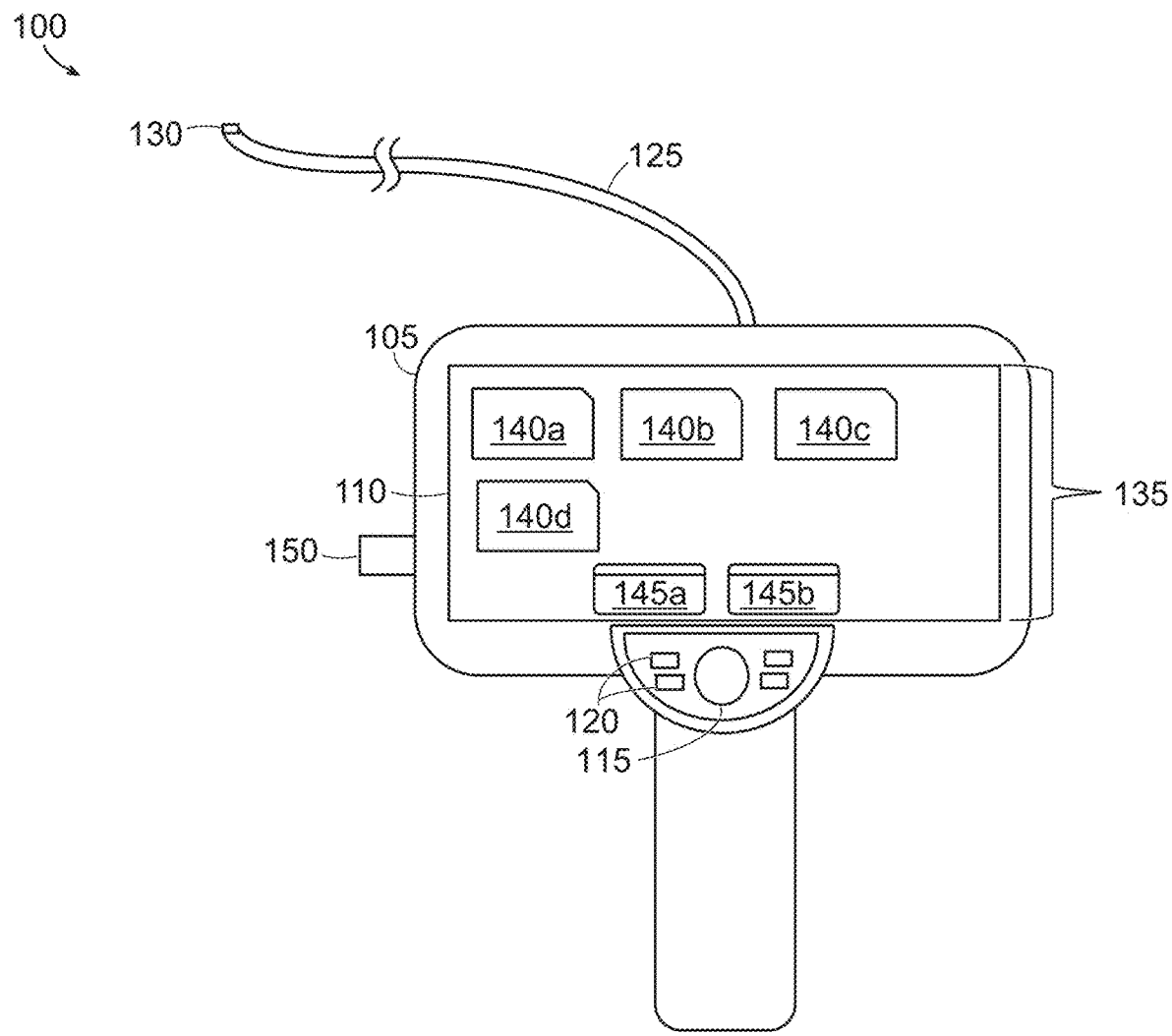
FIG. 1 is a diagram for system and method for merging multiple inspections from one or more borescopes into a single inspection and report as described herein.

FIG. 1 is a diagram that illustrates an generic borescope system 100. The borescope system 100 can include a housing 105 configured to house a computing device for the system 100 as well as a user interface display (UI) 110 communicatively coupled to the computing device. In some embodiments, the UI 110 can be a touchscreen display. The borescope 100 can further include a joystick 115 and/or a plurality of buttons 120 configured to control operations of the borescope system 100. In some aspects, the system 100 can further include an insertion tube 125 having a image sensor 130 or other sensor type disposed at a distal end thereof, which can be controlled by the system 100 to execute an inspection of an asset. The borescope 100 can be controlled by a computing device (not shown) which can include at least one data processor and a memory storing inspection data and instructions which, when executed by the at least one processor, cause the at least one processor to perform operations, as described in greater detail below. In some embodiments, the at least one processor can be configured to generate a plurality of graphical user interface displays (GUIs) 135 within the UI 110 to be interacted with by a user.

In some embodiments, the borescope 100 can include a GUI 135 which displays a plurality of inspections 140a-140d which can be selected and viewed by the user. In some embodiments, the plurality of inspections can be in the form of inspection folders, wherein each folder includes an inspection file, and one or more additional files corresponding to one or more inspection points of each inspection. In some embodiments, the inspection file can include an inspection template comprising one or more nodes corresponding to the one or more inspection points. In some aspects, the inspection file can be a human-readable and computer readable text file (e.g., an XML file, or the like) corresponding to the inspection. In some aspects, the one or more additional files and include images and/or videos of the one or more inspection points captured during the inspection. In some embodiments, the one or more additional files can further include human-readable and computer readable text files (e.g., an XML files, or the like) comprising metadata corresponding to one or more images and/or videos captured during the inspection, as discussed in greater detail below.

In some embodiments, the GUI 135 can also include a plurality of virtual buttons 145a-145b configured to further control the system 100. For example, in some embodiments of the systems and methods described herein, the plurality of buttons 145a-145b can include a Merge button 145a. The Merge button 145a can be configured to launch a merge GUI wherein the user may select two or more inspections of the plurality of inspections 140a-140d (or additional inspections stored on an external drive 150 communicatively coupled to the system via a USB port or the like) to be merged into a merged inspection, as described in greater detail below. In some embodiments, the plurality of buttons 145a-145b can further include but are not limited to an edit inspection button and a resume/stop inspection button.

Figure 2:
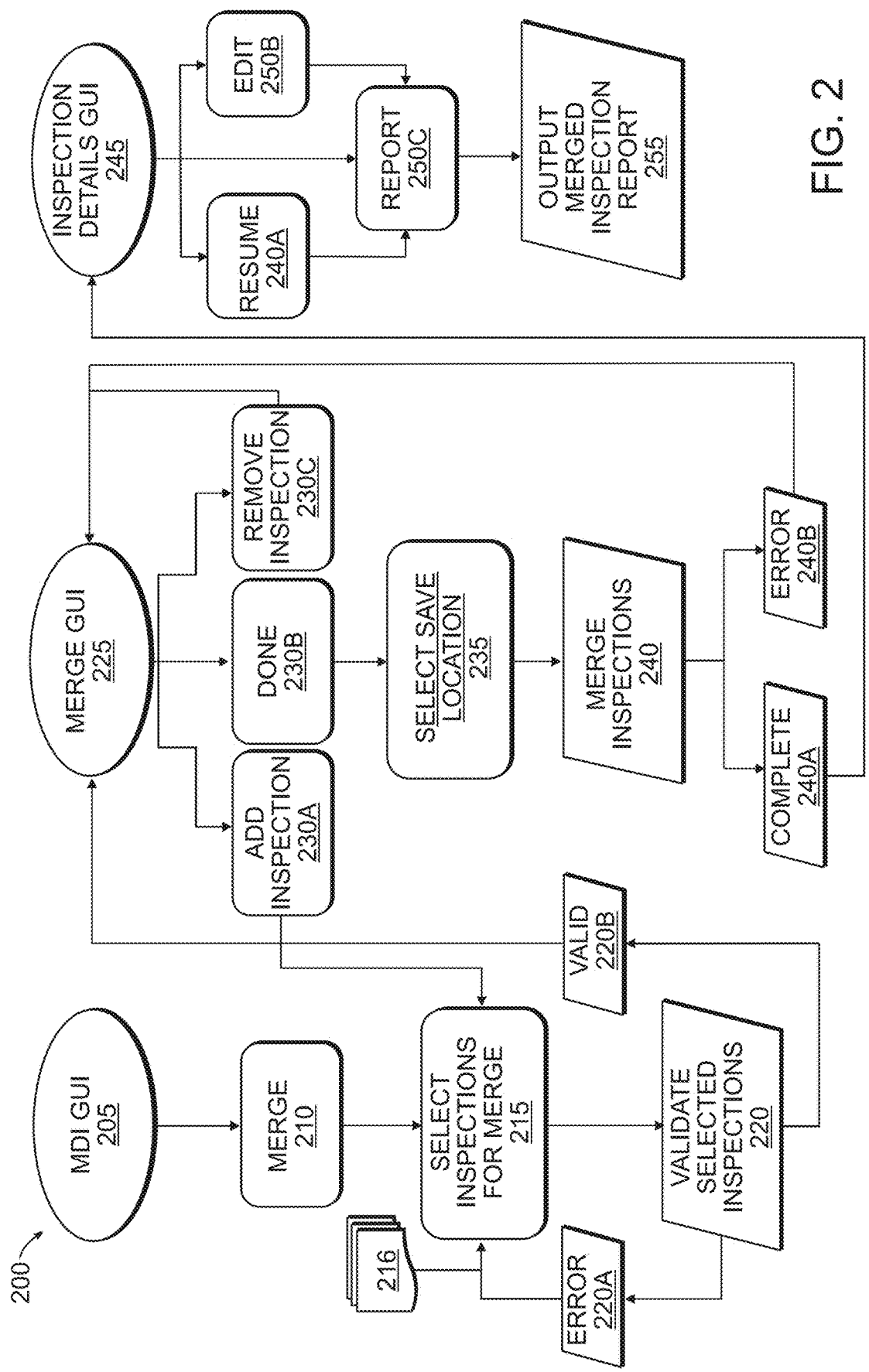
FIG. 2 is a system flow diagram for an embodiment of a system and method of use thereof for merging multiple inspections from one or more borescopes into a single merged inspection and report.

FIG. 2 is a system flow diagram for an embodiment of a system 200 and method of use thereof for merging multiple inspections from one or more borescopes into a single merged inspection and report as described herein by interacting with a plurality of GUIs (e.g., GUI 145 of FIG. 1) generated within a UI of a borescope. While the plurality of GUIs generated will be introduced with reference made to FIG. 2, specific details regarding the plurality of GUIs will be sufficiently described throughout the specification and figures. The system 200 and method of using the system described herein can be implemented within a borescope device (e.g., the borescope 100 of FIG. 1). As sown in FIG. 2, the system 200 can include a Menu Directed Inspection (MDI) GUI 205. In some embodiments, the MDI GUI 205 can be similar to the GUI 135 of FIG. 1. A user can interact with the UI (or a joystick or a plurality of buttons, as described above) to launch the MDI GUI 205. The MDI GUI 205 can include a visual representation of the inspections/inspection templates that are stored on the borescope. From the MDI GUI 205, the user can select a Merge button 210 to initiate an inspection merging process.

Once the user has selected the Merge button 210, the user can be prompted to select two or more inspections to be merged at 215 from a plurality of inspections 216. In some embodiments, the MDI GUI 205 can include a file explorer configured to allow the user to navigate through the inspections 216 stored directly on the borescope. In some embodiments, the user can further be enabled to navigate through inspections stored on an external drive (e.g., a USB drive or the like), in a case where the external drive has been communicatively coupled to the borescope to transfer inspection data from one device to another. After selecting two or more inspections to be merged, the system 200 can be configured to validate the selected inspections at 220, as described in greater detail below. In an event that there is an error 220A in the validation process, the system 200 can be configured to return to the inspection selection step at 215 and provide the user with a notification of the error. In an event that the inspections are valid 220B, the system 200 can be configured to launch a Merge GUI 225. In some embodiments, the Merge GUI 225 can include a visualization (e.g., a list) of the selected and validated inspections to be merged. The Merge GUI 225 can further include an Add Inspection button 230A, a Done button 230B and/or a Remove Inspection button 230C. The user can select button 230A to return to the inspection selection step at 215 to add additional inspections. The user can select the Done button 230B to confirm that the selected inspections are correct and that the user would like to move forward with the merge. Further, the user can select the Remove Inspection button 230C in order to remove a previously selected inspection from the list of inspections to be merged. In some embodiments, the Merge GUI 225 can additionally include a cancel button (not shown) to cancel a merging operation and return to the MDI GUI 205 (main menu).

Responsive to the user selecting the Done button 230B, the system 200 can be configured to prompt the user, at 235, to select a location within the memory of the system 200 to save the merged inspection. In some aspects, the system 200 can further be configured to merge the selected inspections into a merged inspection. In an event where the merge completes successfully, indicated by 240A, the system 200 can be configured launch an Inspection Details GUI 245 and/or a Live Inspection GUI (not shown) which can be used to interact with the generated merged inspection, as discussed in greater detail below. Alternatively, in an event where there is an error with the merge, indicated by 240B, the system 200 can be configured to return to the Merge GUI 225 and provide a notification to the user indicating the error encountered. Once the merged inspection is successfully generated and the system 200 has launched the Inspection Details GUI 245, the user can be enabled to resume/stop the merged inspection, at 250A, edit the merged inspection, at 250B, or to print a report of the inspection, at 250C, as discussed in greater detail below.

Figure 3A:
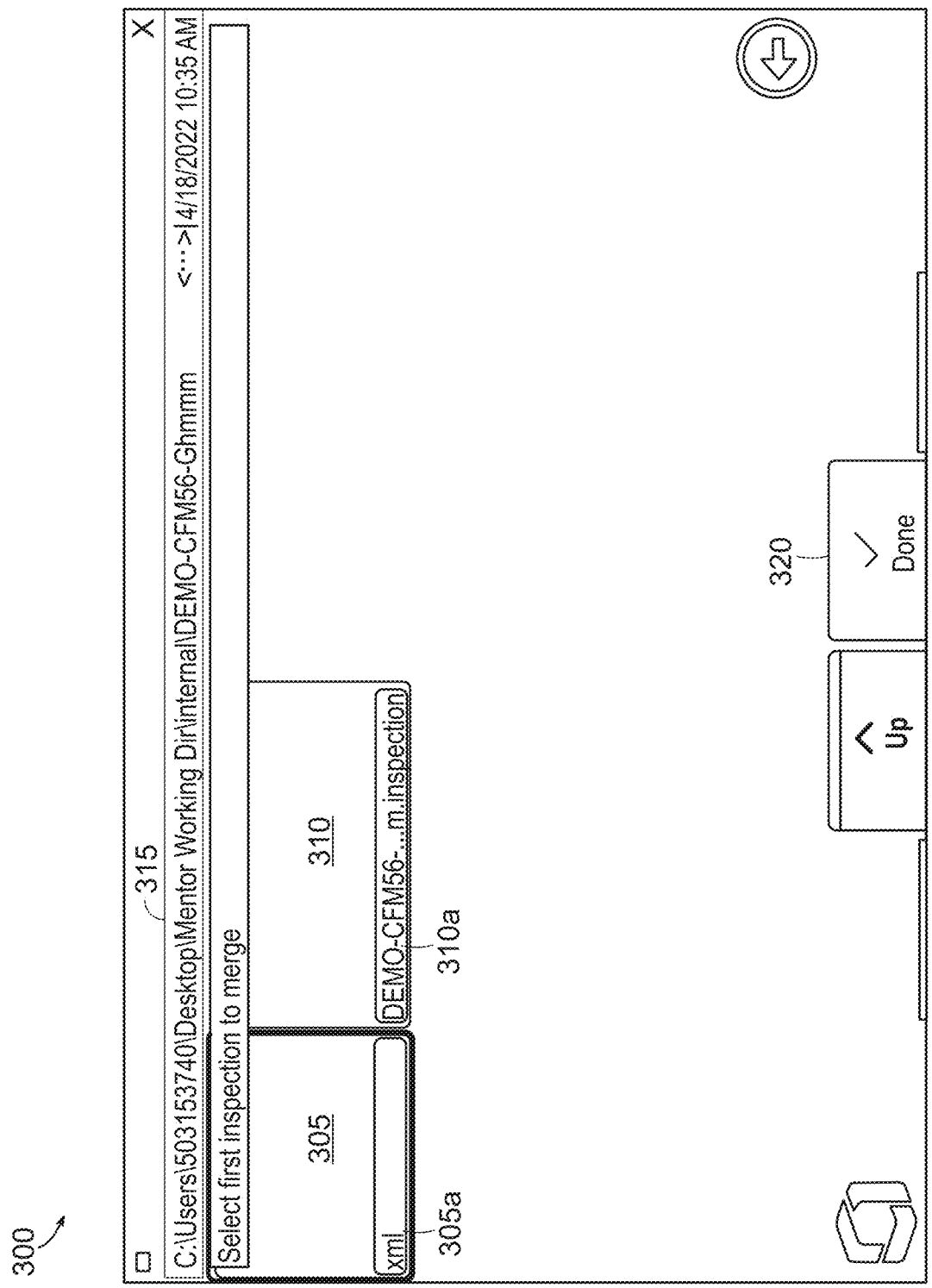
FIG. 3A illustrates an exemplary embodiment of an MDI GUI of the borescope system of FIG. 1.

FIG. 3A illustrates an exemplary embodiment of an MDI GUI 300 of the borescope system (e.g., system 100) as described herein. In some embodiments, the MDI GUI 300 can be launched by the system responsive to a selection of a merge button (e.g., the Merge button 210 of FIG. 2). In some aspects, the MDI GUI 300 can be a file manager, wherein the user may select a plurality of inspections (e.g, inspections 305, 310) to merge into a merged report. Each inspection stored within the memory of the system (e.g, inspections 305, 310) can include an inspection template, as described above, and an inspection ID (e.g., inspection IDs 305a, 310a). In some aspects, the MDI GUI 300 include a search bar or inspection path 315, wherein the user can filter inspection files based on where they are saved within the memory of the system. In some aspects, the system can further include a USB port or the like, configured to receive an external drive as described above. In this case, the user can be configured to transfer inspections from other borescopes or computing devices onto the system and use search bar or inspection path 315 to the filter the inspections, to view the additional inspections stored on the external drive. In some embodiments, the user can be configured to select inspections one at a time or multiple at a time. Once all of the desired inspections have been selected, the user can select a Done virtual button 320 to move forward with the merging process. In some embodiments, after the user has selected two inspections, the system can be configured to list the inspections to be merged automatically, as discussed in greater detail below.

Responsive to the user selecting a second inspection and each subsequent inspection thereafter, the system can be configured to determine whether or not the selected inspection is capable of being merged with the first inspection and any other inspections selected through a validation process. The validation process can include comparing the inspection templates of the selected inspections as well as the inspection IDs of the selected inspections to ensure that they match. In the event of a validation error (e.g., the inspection templates and/or the inspection IDs do not match), the system can be configured to remain in MDI GUI 300 file manager and provide the user with a notification indicative of the error type.

Figure 3B:
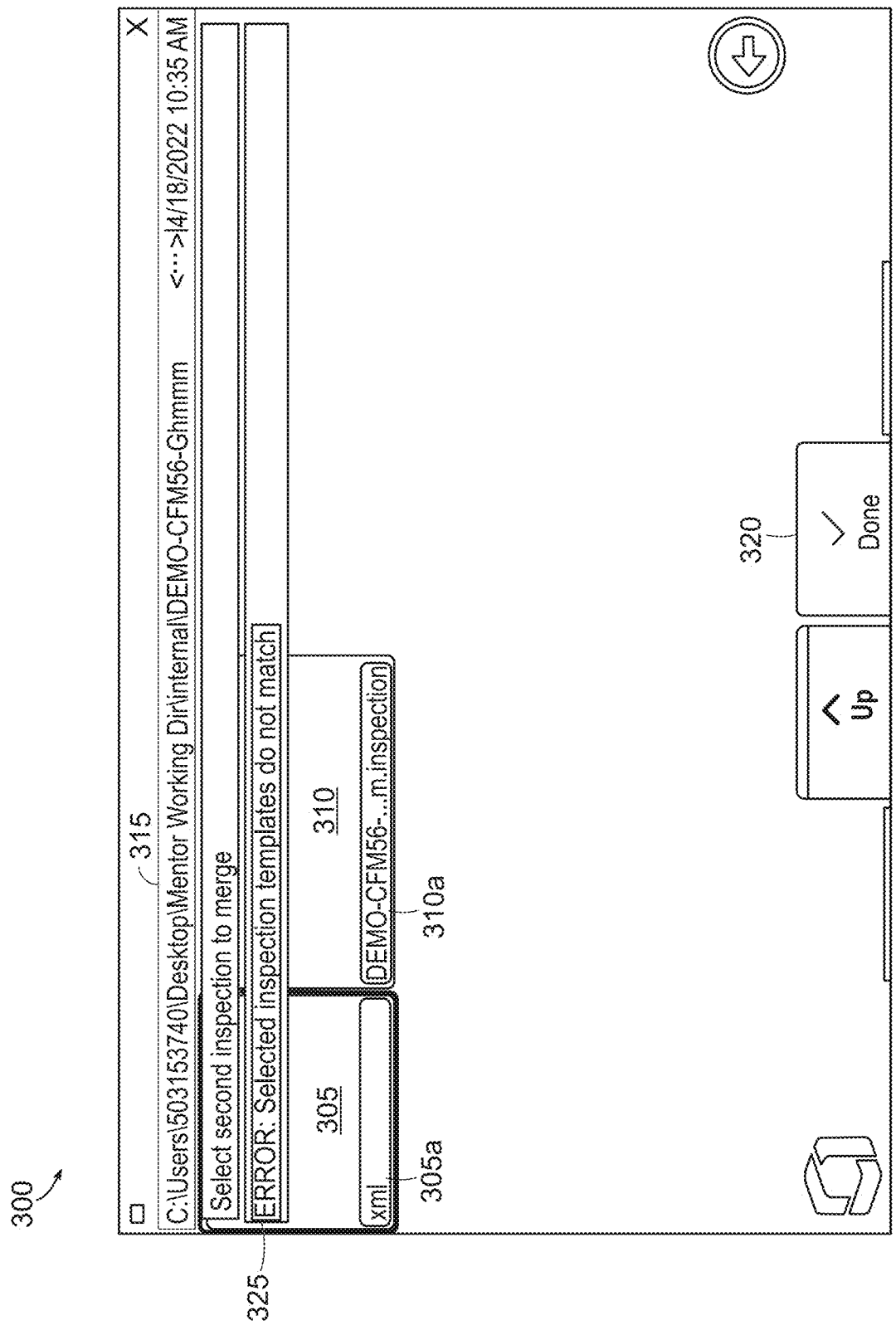
FIG. 3B illustrates another exemplary embodiment of the MDI GUI of FIG. 3A.

For example, FIG. 3B illustrates an exemplary embodiment of the MDI GUI 300 of the borescope system (e.g., system 100), accordingly, like components will not be described. As shown in FIG. 3B, in an event where a template incompatibility error has occurred during the validation process. Accordingly, in this case, the system can be configured to provide the user with a template error notification 320 within the MDI GUI 300.

Figure 3C:
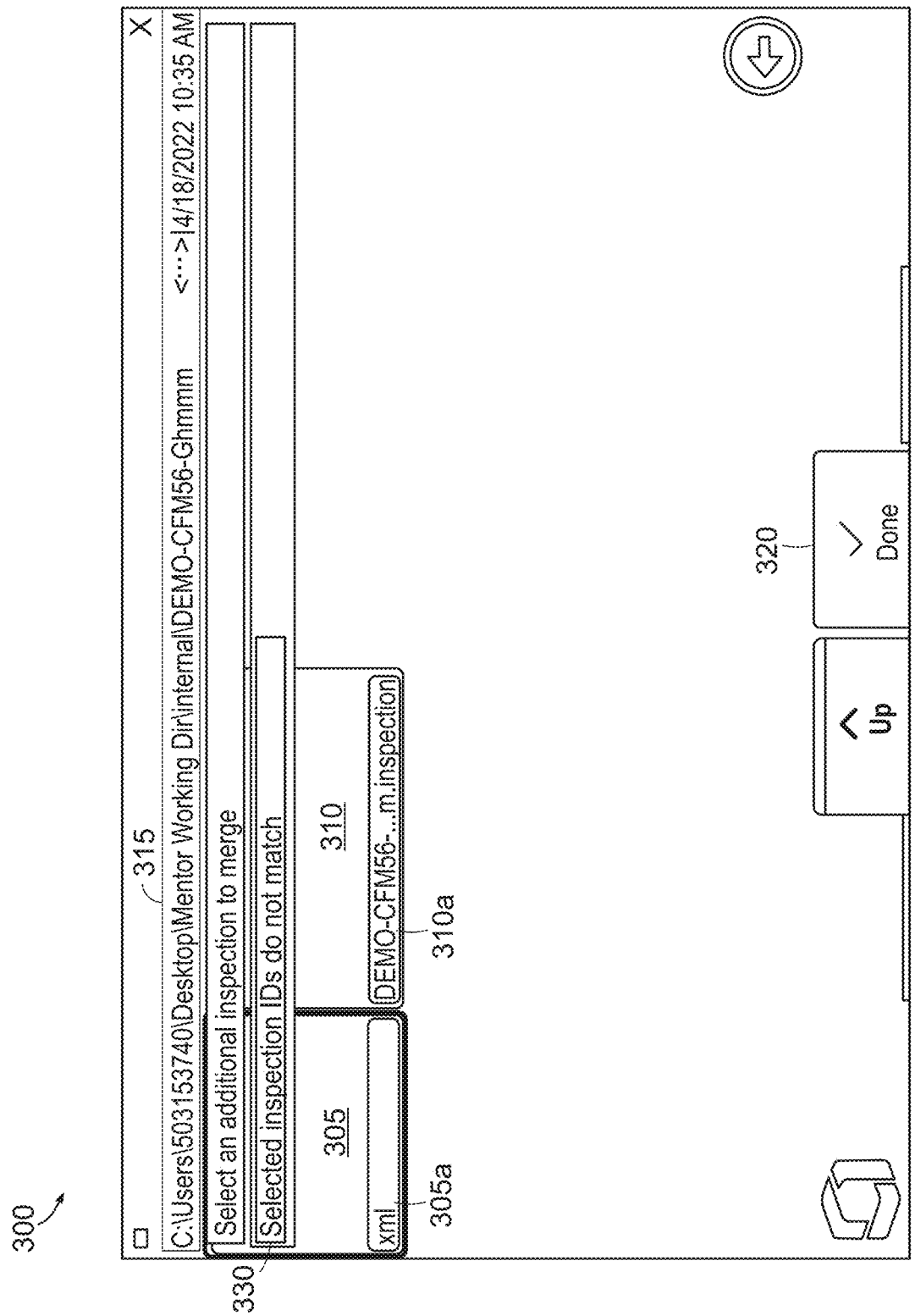
FIG. 3C illustrates another exemplary embodiment of the MDI GUI of FIG. 3A.

In another example, FIG. 3C illustrates an exemplary embodiment of the MDI GUI 300 of the borescope system (e.g., system 100), accordingly, like components will not be described. As shown in FIG. 3C, in an event where an ID incompatibility error has occurred during the validation process. Accordingly, in this case, the system can be configured to provide the user with an ID error notification 325 within the MDI GUI 300.

Figure 4:
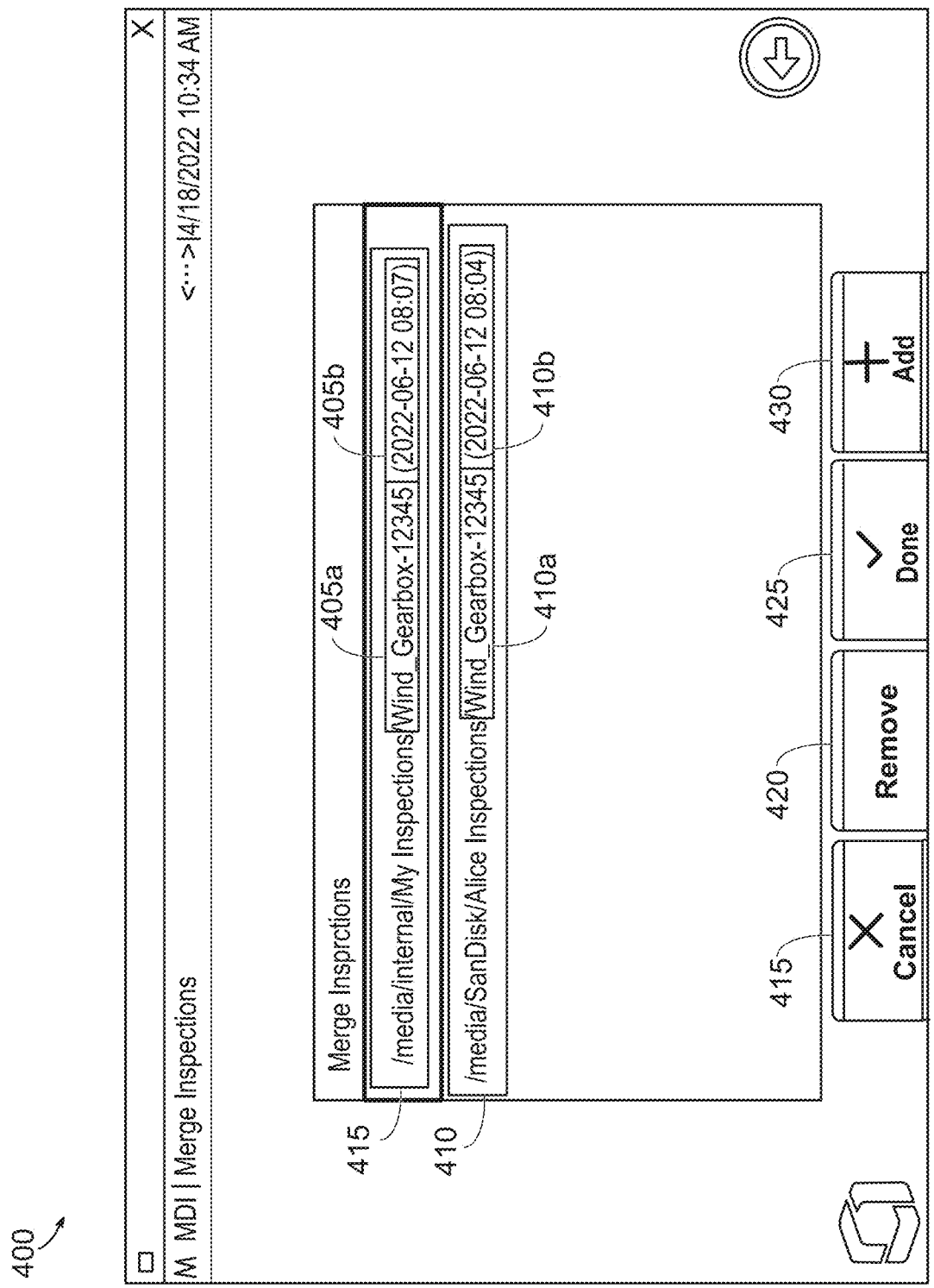
FIG. 4 illustrates an exemplary embodiment of a Merge GUI of the borescope system of FIG. 1 configured to list inspections being merged as described herein.

As described above, responsive to the user indicating that all of the desired inspections have been selected or after the user has selected two inspections, the system can be configured to list the inspections to be merged within a Merge GUI 400, as illustrated in FIG. 4. As shown in FIG. 4, the Merge GUI 400 can include a visualization (e.g., a list) of the selected and validated inspections 405, 410 to be merged. In some aspects, the Merge GUI 400 can be similar to the Merge GUI 225 of FIG. 2. In some embodiments, the validated inspections 405, 410 can each include an inspection ID 405a, 410a and a time 405b, 410b at which the inspection was performed. As described above, the system can be configured to compare the inspection IDs 405a, 410a prior to merging, to ensure that they match, as shown in FIG. 4.

The Merge GUI 400 can further include a Cancel button 415, a Remove button 420, a Done button 425 and an Add button 430. The user can select the Cancel button 415 to cancel the merge process. Additionally, responsive to selecting an inspection, or multiple inspections, (e.g., inspection 405, as shown), the user can select the remove button 420 to remove the selected inspection from the merge. The user can select the Done button 425 to confirm that the selected inspections are correct and that the user would like to move forward with the merge, as described in greater detail below. Further, the user can select the Add button 430 to return to the inspection selection step of the MDI GUI 300, of FIGS. 3A-3C to select additional inspections to be added to the merge.

Figure 5:
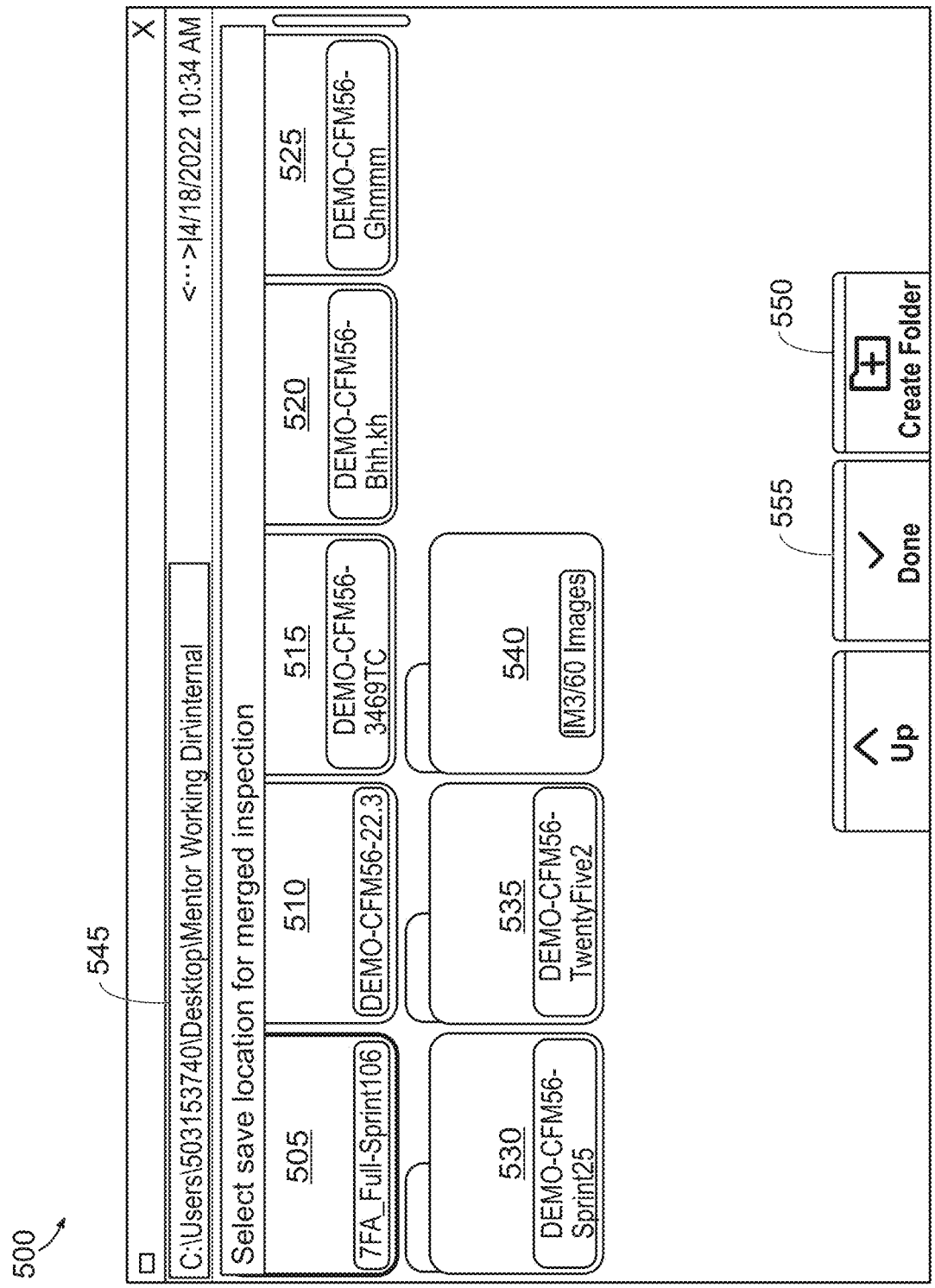
FIG. 5 illustrates an exemplary embodiment of a Save Location GUI 500 of the borescope system of FIG. 1 configured to enable a user to select a location within the memory of the system to save a merged inspection.

Responsive to the user selecting the Done button 425, the system can be configured automatically generate the merged inspection, as described in greater detail below, and launch a Save Location GUI 500, as shown in FIG. 5. The Save Location GUI 500 can enable a user to select a location within the memory of the system to save the merged inspection. In some aspects, the Save Location GUI 500 can be similar to the MDI GUI 300, of FIG. 3, in that it can be a sort of file manager, wherein the user may navigate through folders 505-540 that are stored within the memory of the system (or stored on an external drive as described above). In some aspects, the Save Location GUI 500 can also include a search bar or inspection path 545, wherein the user can filter inspection folders 505-540 based on where they are saved within the memory of the system. In an event where a user would like to create a new folder within the system to save the merged inspection to, the user can select a Create Folder button 550 in order to create a new folder. The Save Location GUI 500 can further include a Done button 555. In some embodiments, responsive to selecting the Done button 555, the system can be configured to perform an additional error check. In an event where there is an error with the merge after selecting the Done button 555, the system can be configured to return to the Merge GUI 400 and provide a notification to the user indicating the error encountered. In this case, responsive to the type of error notification received, the user can interact with the Cancel button 415, Remove button 420, Done button 425 and Add button 430, as described above, to correct the error.

Figure 6:
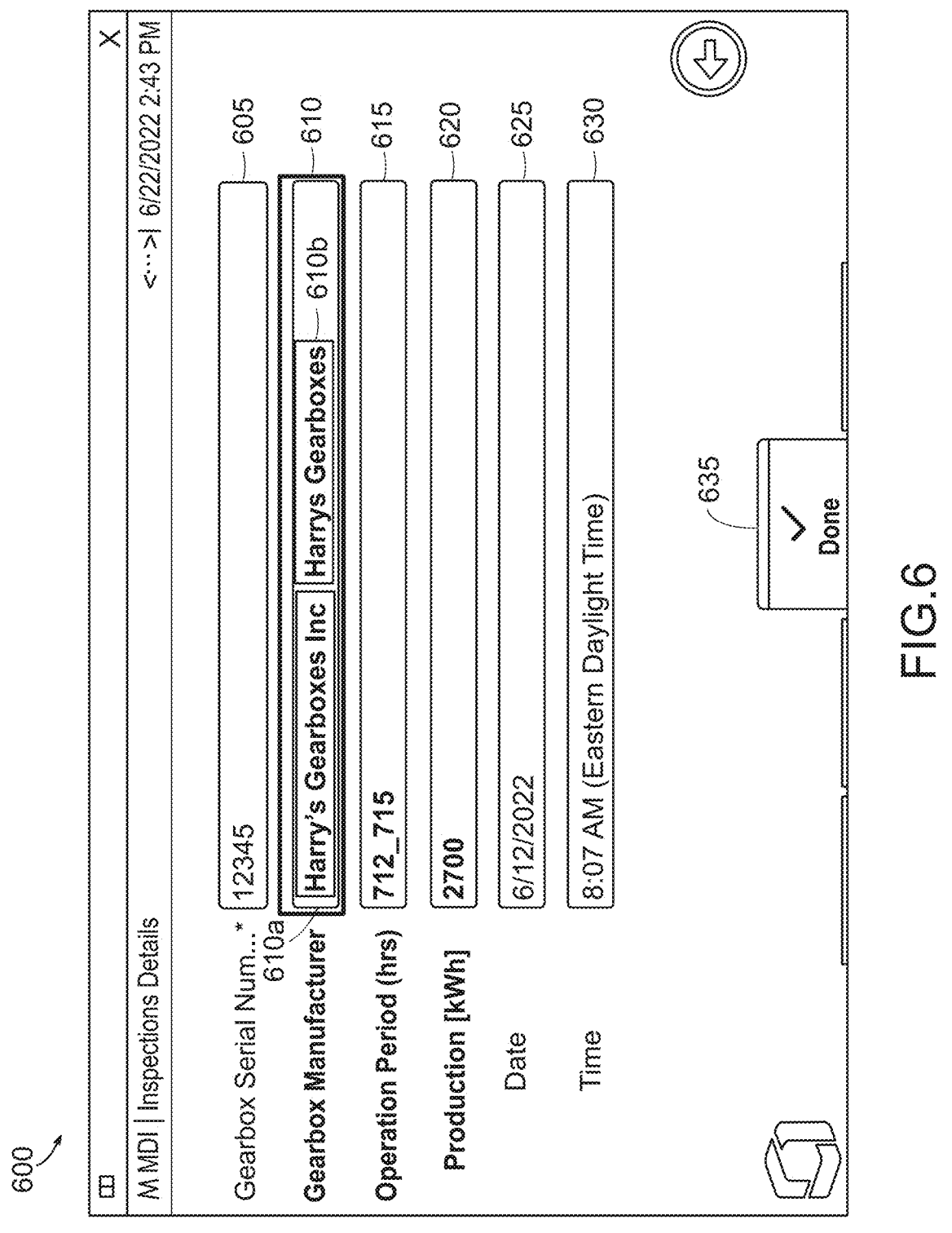

In an event where not errors occur responsive to selecting the Done button 555, the system can be configured to launch an Inspection Details GUI 600, as shown in FIG. 6. The Inspection Details GUI 600 can include a plurality of details fields 605-630 regarding the merged inspection. The user can interact with the plurality of details fields 605-630 in order to modify the details of the merged inspection. For example, the details fields 605-630 can include an ID field 605. In some embodiments, the ID field 605 can include a matching ID for the plurality of inspections being merged. The Inspection Details GUI 600 can also include a merged inspection title field 610. In some embodiments, the title field 610 can be automatically generated by the system during the merge. For example, in a case where a first inspection being merged has a first title 610a and a second inspection being merged has a second title 610b, the system can be configured to generate the title 610 of the merged inspection based on the first title 610a and the second title 610b, as shown in FIG. 6. In some aspects, the title field 610 can be automatically generated by concatenating strings together with a separator (e.g., an underscore). In some aspects, the title field 610 can be automatically generated based on the title of the first inspection 610a or the second inspection 610b. The Inspection Details GUI 600 can also include a merged operation period field 615. In some embodiments, the merged operation period field 615 can be generated similarly to as described above for the title field 610. The Inspection Details GUI 600 can also include a date field 625 and a time field 630. In some embodiments, the system can be configured to automatically determine the date field 625 and time field 630 by selecting the date and time fields for any one of the inspections selected (e.g., the first inspection selected or the last inspection selected). In some embodiments, the system can be configured to automatically determine the date field 625 and time field 630 by selecting the earliest or latest date and time from the selected inspections being merged. The Inspection Details GUI 600 can also include a Done button 635.

Figure 7:
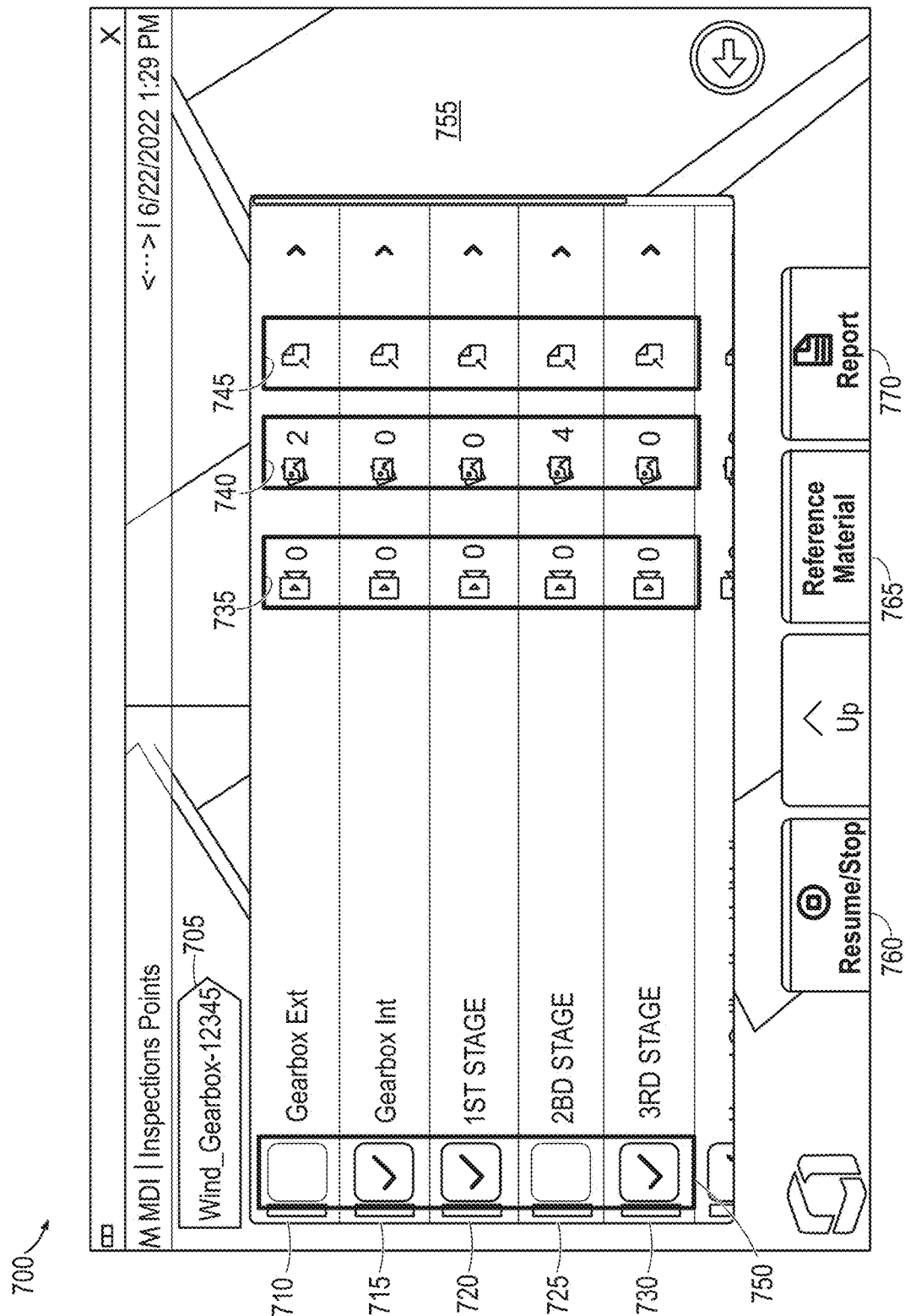
FIG. 7 illustrates an exemplary embodiment of a Live Inspection GUI of the borescope system of FIG. 1 configured to display various nodes of a merged inspection for an asset and enable a user to resume the merged inspection.

Responsive to confirming/modifying the merged inspection details within the Inspection Details GUI 600 and selecting the Done button 635, the system can be configured to launch a Live Inspection GUI 700, for a merged inspection of an asset 705, as shown in FIG. 7. In some aspects, the Live Inspection GUI 700 can display various nodes 710-730 of a merged inspection for an asset 705. The nodes 710-730 can correspond to inspection points within the asset 705. For example, node 720 can correspond to an inspection of a first stage of the asset 705, and node 725 can correspond to an inspection of a second stage of the asset 705. Each node 710-730 can include inspection data from each inspection included in the merged inspection that inspected that node. In some aspects, the inspection data at each node 710-730 can include human-readable and computer-readable text files (e.g., an XML files, or the like), videos 735 of the asset 705 captured during the inspection, images 740 of the asset 705 captured during the inspection and/or inspection reports 745 for each node 710-730. Additionally, each node 710-730 can include an approved box 750, wherein the user can indicate, by checking the approved box 750 of each node 710-730, whether or not that node has been approved. In some embodiments, responsive to generating the merged inspection, the system can be configured to automatically check, or leave unchecked, each approved box 750 based on an approved status of each of the nodes of each of the inspections included in the merged inspection.

As an illustrative example, in a case where the merged inspection is merging a first inspection of the asset 705 at each of the nodes 710-730 and a second inspection of the asset 705 at each of the nodes 710-730, each nodes 710-730 of the merged inspection can include first inspection data from the first inspection and inspection data from the second inspection. The first inspection could have been performed by a first inspector at a first time, and the second inspection could have been inspected by the first inspector (or a different inspector) at a second time. In this case, the first inspection data from the first inspection can include a portion of the human-readable and computer-readable text files (e.g., an XML files, or the like), videos 735, images 740 and/or inspection reports 745 for each node 710-730. Similarly, the second inspection data from the second inspection can include a portion of the human-readable and computer-readable text files (e.g., an XML files, or the like), videos 735, images 740 and/or inspection reports 745 for each node 710-730. Additionally, in this example, the first inspection can include a first set of approved statuses each of the nodes 710-730 for the first inspection and the second inspection can include a second set of approved statuses each of the nodes 710-730 for the second inspection. In this case, the system can be configured to determine, automatically, whether to check, or leave unchecked, the approved box 750 for each node 710-730 of the merged inspection based on an approved status of each of the nodes of each of the first inspection and the second inspection. For example, if node 715 was approved in both the first inspection and the second inspection, the system can be configured to automatically check the approved box 750 for node 715 of the merged inspection, as shown in FIG. 7. Alternatively, for example, if node 725 was not approved in either the first inspection or the second inspection, or both, the system can be configured to automatically uncheck the approved box 750 for node 725 of the merged inspection, as shown in FIG. 7.

In another illustrative example, the merged inspection can merge a first inspection of a first portion of the asset 705 (e.g., at of nodes 710, 715 and 720) and a second inspection of a second portion of the asset 705 (e.g., at nodes 725 and 730). In this case, nodes 710, 715 and 720 of the merged inspection can include inspection data from the first inspection and nodes 725 and 730 of the merged inspection can include inspection data from the second inspection. The first inspection could have been performed by a first inspector at a first time, and the second inspection could have been inspected by the first inspector (or a different inspector) at a second time (or at the same time as the first inspection). In this case, the first inspection data from the first inspection can include the human-readable and computer-readable text files (e.g., an XML files, or the like), videos 735, images 740 and/or inspection reports 745 for the nodes 710, 715 and 720. Similarly, the second inspection data from the second inspection can include the human-readable and computer-readable text files (e.g., an XML files, or the like), videos 735, images 740 and/or inspection reports 745 for the nodes 725 and 730. Additionally, in this example, the first inspection can include a first set of approved statuses the nodes 710, 715 and 720 for the first inspection and the second inspection can include a second set of approved statuses for the nodes 725 and 730 for the second inspection. In this case, the system can be configured to determine, automatically, whether to check, or leave unchecked, the approved box 750 for each node 710-730 of the merged inspection based on an approved status of each of the nodes of each of the first inspection and the second inspection.

As shown in FIG. 7, in a case where the user is resuming the merged inspection to continue in inspecting the asset 705, the Live Inspection GUI 700 can further include a Live View 755. The Live View 755 can be a current view of the asset 705 as seen from an image sensor of the borescope system (e.g., sensor 130 of borescope 100 of FIG. 1) that is positioned at an inspection point of the asset. The Live Inspection GUI 700 can also include a Resume/Stop button 760 that a user can interact with to resume/stop the merged inspection. In some embodiments, the Resume/Stop button can also be used to capture photos and/or videos of the inspection point of the asset 705 to be saved to a node of the plurality of nodes 710-730 that corresponds to the inspection point.

In some aspects, the Live Inspection GUI 700 can advantageously provide the user with an ability to manually approve nodes that do not include any additional files (e.g., videos 735, images 740 and/or reports 745). This is particularly advantageous in a case where there are many nodes. This allows for a user to inspect and approve the many nodes without having to take significant time to take videos or pictures of inspection points that do not have any issues.

In some embodiments, the Live Inspection GUI 700 can also include a Reference Material button 765, which a user can interact with to view various reference materials associated with the merged inspection. The Live Inspection GUI 700 can also include a Report button 770. Responsive to the user selecting the Report button 770, the system can be configured to generate a merged report for the merged inspection. In some embodiments, the merged report can be a comprehensive text file (e.g., a Word of PDF file or the like) that includes all of the details for the merged inspection. In some embodiments, the merged inspection can be automatically retained within the memory of the system.

Figure 8A:
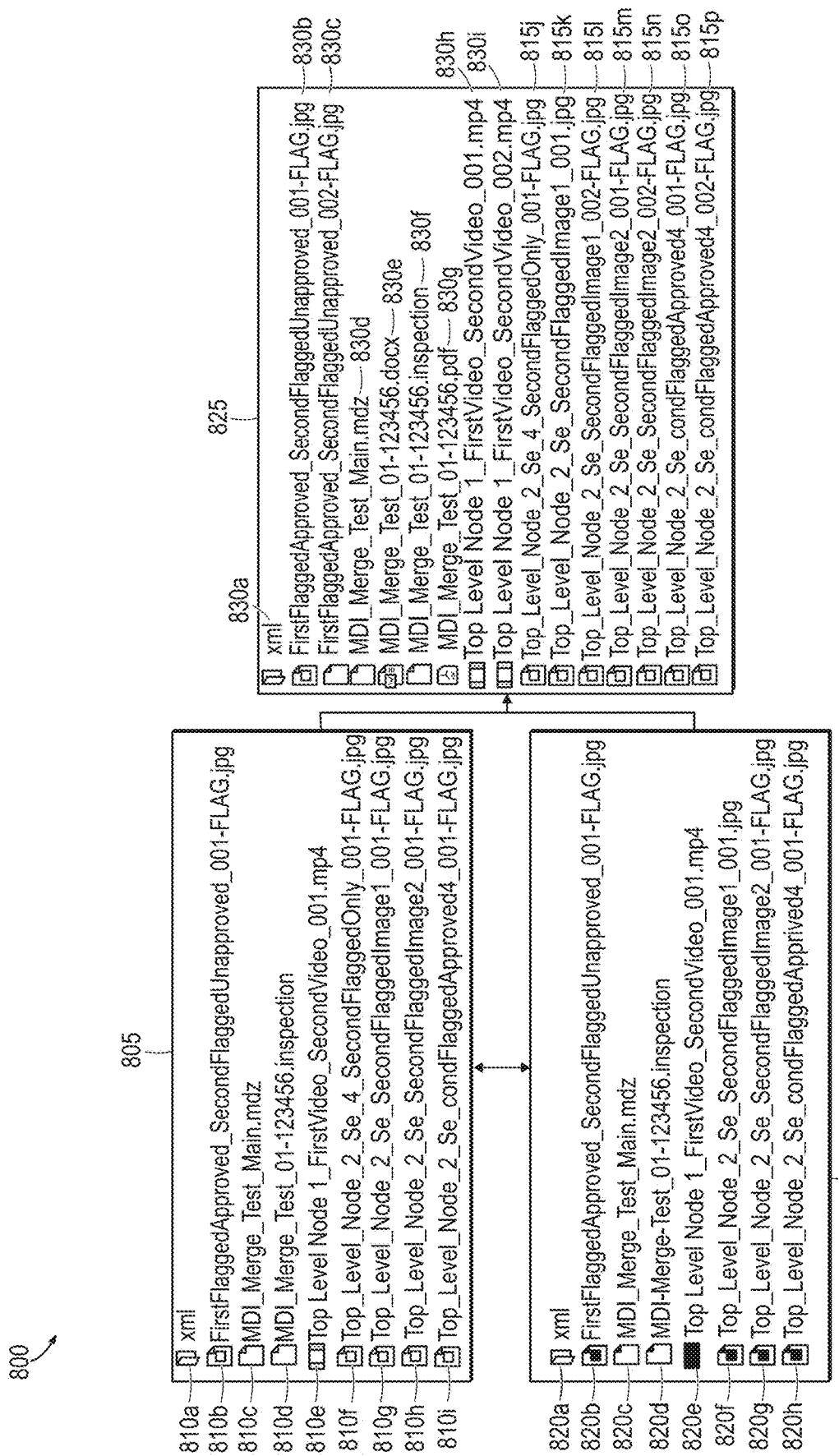
FIG. 8A is a flow diagram illustrating an exemplary merging process for merging a first inspection with a second inspection to generate a merged inspection using the systems and methods described herein.

FIG. 8A is a flow diagram 800 illustrating an exemplary merging process for merging a first inspection 805 with a second inspection 815 to generate a merged inspection 825.

In some embodiments, the merging process can also include additional inspections to be merged (e.g., a third, fourth, etc. inspection).

As shown in FIG. 8A, the first inspection 805 can comprise a plurality of files/folders 810a-810i. The plurality of files/folders 810a-810i can include, for example, a folder 810a. In some aspects, the folder 810a can include a plurality of text based files (e.g., XML files) containing metadata corresponding to other files within the first inspection 805. The plurality of files 810a-810i can also include a plurality of image files 810b and 810f-810i corresponding to images captured at one or more inspection points of the first inspection. The plurality of files 810a-810i can also include one or more video files 810e corresponding to videos captured at one or more inspection points of the first inspection. The plurality of files 810a-810i can also include one or more first inspection files 810c-810d. In some aspects, the one or more first inspection files can be human-readable, machine-readable files comprising a first inspection template comprising one or more first nodes corresponding to one or more first inspection points of the first inspection.

Similarly, as shown in FIG. 8A, the second inspection 815 can comprise a plurality of files/folders 820a-820h. The plurality of files/folders 820a-820h can include, for example, a folder 820a. In some aspects, the folder 820a can include a plurality of text based files (e.g., XML files) containing metadata corresponding to other files within the second inspection 815. The plurality of files 820a-820h can also include a plurality of image files 820b and 820f-820h corresponding to images captured at one or more inspection points of the second inspection. The plurality of files 820a-820h can also include one or more video files 820e corresponding to videos captured at one or more inspection points of the second inspection. The plurality of files 820a-820h can also include one or more second inspection files 820c-820d. In some aspects, the one or more second inspection files can be human-readable, machine-readable files comprising a second inspection template comprising one or more second nodes corresponding to one or more second inspection points of the second inspection.

In some aspects, the first inspection template and the second inspection template can be the same, but can include different inspection data stored within the one or more first nodes and one or more second nodes.

During a merging process, as shown in FIG. 8A, the system can be configured to merge the first inspection 805 and the second inspection 815 into a merged inspection 825. In some embodiments, the merged inspection 825 can comprise a plurality of files/folders 830a-830p. The plurality of files/folders 830a-830p can include, for example, a folder 830a. In some aspects, the folder 830a can include the plurality of text based files containing metadata corresponding to other files within the merged inspection. In some aspects, the plurality of files/folders 830a-830p can also include a plurality of image files 830b-830c and 830j-830p corresponding to images captured at one or more inspection points of the merged inspection. For example, the plurality of image files 830b-830c and 830j-830p can be a combination of the image files of the first inspection 805 and the second inspection 815. The plurality of files/folders 830a-830p can also include one or more video files 830h-830i corresponding to videos captured at one or more inspection points of the merged inspection. For example, the one or more video files 830h-830i can be a combination of the video files of the first inspection 805 and the second inspection 815. The plurality of files/folders 830a-830p can also include one or more merged inspection files 830d and 830f. In some aspects, the one or more merged inspection files can be human-readable, machine-readable files comprising a merged inspection template comprising one or more merged nodes corresponding to the one or more first nodes and the one or more second nodes.

For example, in a case where the first inspection and the second inspection both correspond to inspections of a first set of nodes within a first inspection template, the merged template of the merged inspection file can include the first inspection template with the first set of nodes, with inspection data from the first inspection and the second inspection saved under each node.

Alternatively, in a case where the first inspection corresponds to an inspection of a first set of nodes within a first inspection template and the second inspection corresponds to an inspection of a second set of nodes within the first inspection template, the merged template of the merged inspection file can include the first inspection template with the first set of nodes and the second set of nodes. In this case, inspection data from the first inspection can be saved under the first set of nodes and inspection data from the second inspection can be saved under the second set of nodes.

In some aspects, the plurality of files/folders 830a-830p can further include one or more merged inspection report files 830e and 830g. In some embodiments, the merged inspection report files 830e and 830g can include comprehensive text files (e.g., a Word of PDF file or the like) including all of the details for the merged inspection, as described above.

In some aspects, the system can further be configured to determine whether one or more naming conflicts exist between a title of the one or more first files 810a-810i of the first inspection 805 and a title of the one or more second files 820a-820h of the second inspection 815. In some aspects, responsive to determining that a naming conflict exists between a title of the one or more first files 810a-810i of the first inspection 805 and a title of the one or more second files 820a-820h of the second inspection 815, the system can be configured to modify at least on of the title of the one or more first files and the one or more second files to resolve the conflict.

For example, as shown in FIG. 8A, image 810i of the first inspection 805 and image 820h of the second inspection 815 can each share the same title. In this case, during the merging process 800, the system can be configured to compare the titles of image 810i and image 820h and determine that there is a naming conflict. Responsive to making this determination, during the merging process, the system can be configured to maintain the name of the image 810i within the merged inspection and modify the name of the image 820h within the merged inspection, as shown in images 830o and 830p, respectively, of the merged inspection 825. In some embodiments, the name of the file being modified can be modified to change an ending number of the title, as shown in FIG. 8A, to follow consecutively from the number of the image 810i. In some embodiments, the system can be configured to resolve a naming conflict by appending a number to the end of the title corresponding to the number of the inspection from which the image corresponds. For example, in a case where three inspections are being merged, and there is a naming conflict determined between a file in each of the three inspections having the name "title", the system can be configured to resolve the naming conflict by modifying the titles of the files in the three inspections to be "title_1", "title_2" and "title_3", respectively. However, other modifications are also realized.

Further, as described above, the plurality of files/folders 830*a*-830*p* can also include one or more human-readable, machine-readable merged inspection files 830*d* and 830*f* (e.g., XML files, or the like. In some aspects, the one or more merged inspection files 830*d* and 830*f* can be files comprising a merged inspection template comprising one or more merged nodes corresponding to the one or more first nodes of the first inspection 805 and the one or more second nodes of the second inspection 815. In some aspects, generating the merged inspection files 830*d* and 830*f* can include parsing the inspection files that are being merged (e.g., the first inspection files 810*c*, 810*d* and the second inspection files 820*c*, 820*d*) to read and parse the content of each file. In some aspects, generating the merged inspection files 830*d* and 830*f* can also include creating a new blank file that will serve as the merged result. In some aspects, generating the merged inspection files 830*d* and 830*f* can also include appending, updating and merging elements of the first inspection files 810*c*, 810*d* and the second inspection files 820*c*, 820*d* based on predefined criteria. In some aspects, generating the merged inspection files 830*d* and 830*f* can also include resolving any naming conflicts, as described above and/or checking for and removing any duplicate files/elements. In some aspects, generating the merged inspection files 830*d* and 830*f* can further include serializing the merged inspection files 830*d* and 830*f* back into a string or a file, depending on predefined requirements.

Figure 8B:
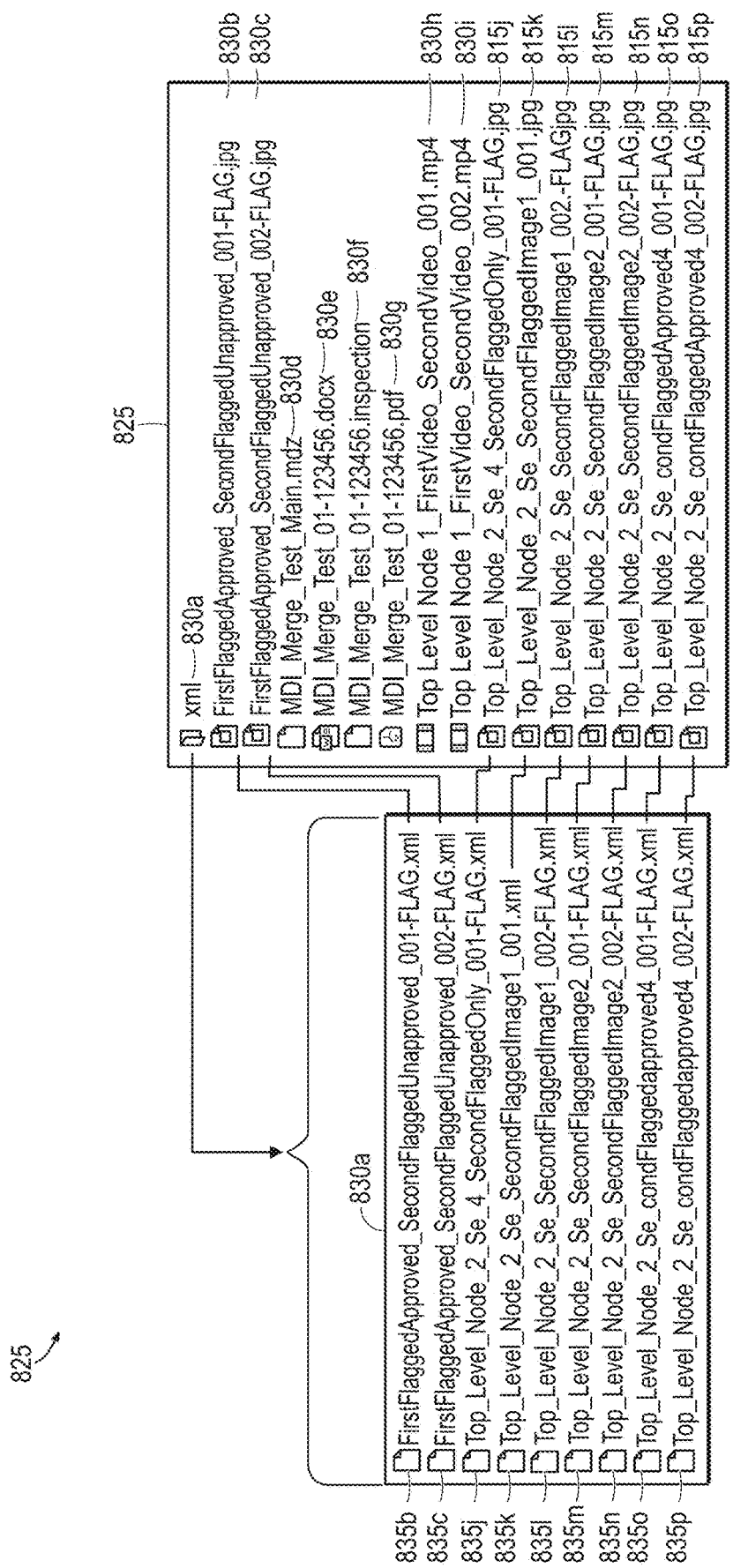
FIG. 8B is a detailed diagram illustrating the contents of the merged inspection of FIG. 8A.

FIG. 8B is a detailed diagram illustrating the contents of the merged inspection 825 of FIG. 8A. As described above and shown in FIG. 8B, the merged inspection 825 can include the plurality of files/folders 830*a*-830*p* comprising a combination of the inspection data of the first inspection 805 and the second inspection 815 of FIG. 8A. As described above, the folder 830*a* can include the plurality of text-based files containing metadata corresponding to one or more of the other files 830*b*-830*p* within the merged inspection. For example, as shown in FIG. 8B, the folder 830*a* can comprise a plurality of human-readable, machine-readable files 835*b*-835*c* and 835*j*-835*p* (e.g., XML files, or the like) containing metadata corresponding to files 830*b*-830*c* and 830*j*-830*p* of the merged inspection 825. With reference made to FIG. 8A, in some aspects, the plurality of files 835*b*-835*c* and 835*j*-835*p* can be comprised of a combination of files located within folder 810*a* of the first inspection 805 and folder 820*a* of the second inspection. Further, in some embodiments, the files 835*b*-835*c* and 835*j*-835*p* within the folder 830*a* can have the same title as the files 830*b*-830*c* and 830*j*-830*p* within the merged inspection 825 to which they correspond. Accordingly, in some embodiments, the system can further be configured to determine whether one or more naming conflicts exist between titles of the files 835*b*-835*c* and 835*j*-835*p* and resolve the determined conflicts similarly to as described above with reference to FIG. 8A.

Figure 9:
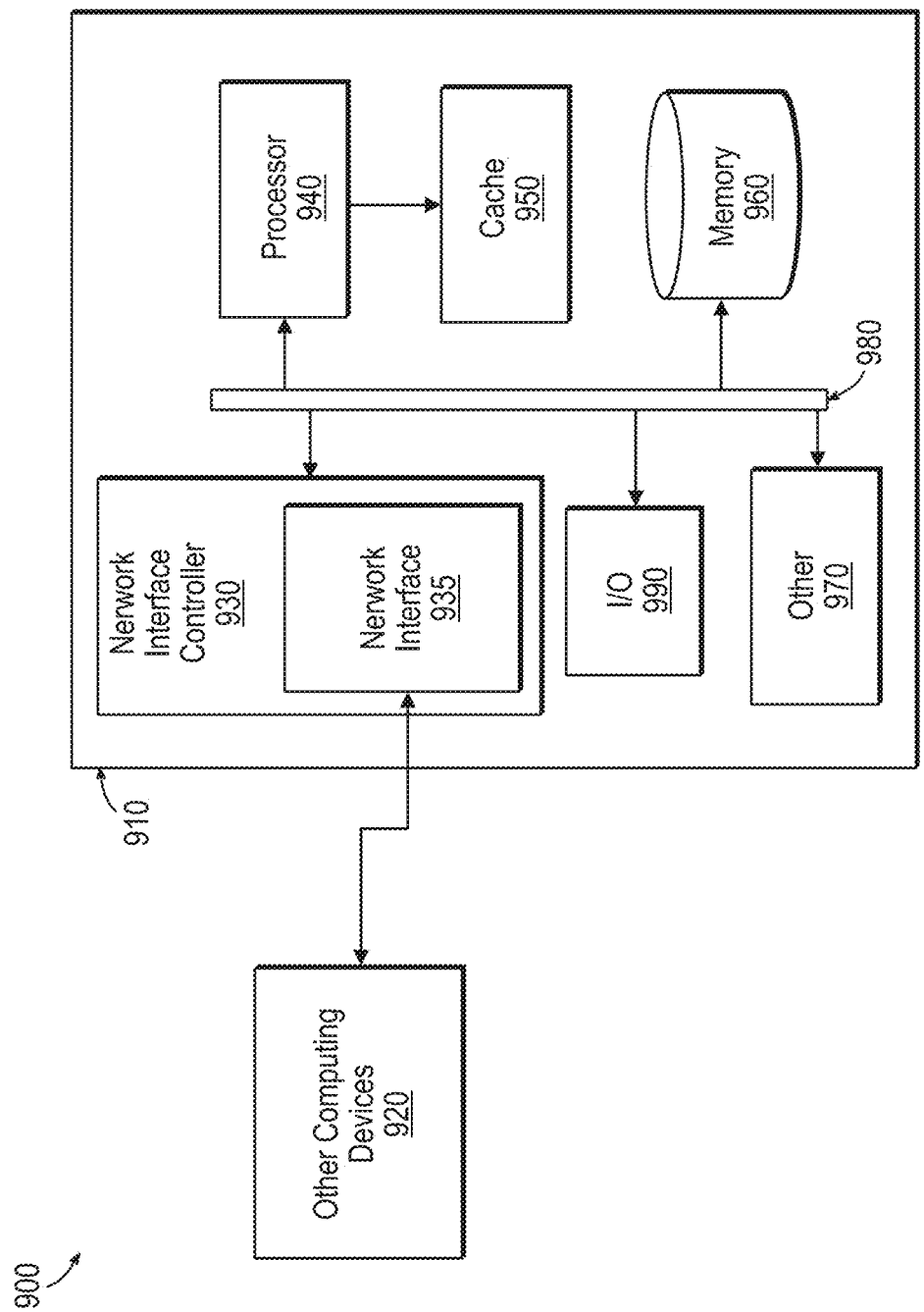
FIG. 9 is a block diagram of an example architecture of a computing system or device of the borescope system of FIG. 1.

FIG. 9 is a block diagram of an example architecture 900 of a computing system or device 910. In some embodiments, the computing system 910 can be configured to receive data from one or more other computing devices 920. In broad overview, the computing system 910 can include a network interface controller 930 including at least one network interface 935 for connecting to the other computing devices 920. The computing system 910 can also include at least one processor 940 for performing actions in accordance with instructions, and one or more memory devices 950 and/or 960 for storing instructions and data. The illustrated example computing system 910 includes one or more processors 940 in communication, via a bus 980, with memory 960. The one or more processors 940 are also in communication, via the bus 980, with each other and with the plurality of other computing devices 920, and any other devices 970. The processor 940 illustrated incorporates, or is directly connected to, cache memory 950. Generally, a processor will execute instructions received from memory. In some embodiments, the computing system 910 can be configured within a cloud computing environment, a virtual or containerized computing environment, and/or a web-based microservices environment.

In more detail, the processor 940 can be any logic circuitry that processes instructions, e.g., instructions fetched from the memory 960 or cache 950. In many embodiments, the processor 940 is an embedded processor, a microprocessor unit or special purpose processor. The computing system 910 can be based on any processor, e.g., suitable digital signal processor (DSP), or set of processors, capable of operating as described herein. In some embodiments, the processor 940 can be a single core or multi-core processor. In some embodiments, the processor 940 can be composed of multiple processors.

The memory 960 can be any device suitable for storing computer readable data. The memory 960 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 910 can have any number of memory devices 960.

The cache memory 950 is generally a form of high-speed computer memory placed in close proximity to the processor 940 for fast read/write times. In some implementations, the cache memory 950 is part of, or on the same chip as, the processor 940.

The network interface controller 930 manages data exchanges via the network interface 935. The network interface controller 930 handles the physical, media access control, and data link layers of the Open Systems Interconnect (OSI) model for network communication. In some implementations, some of the network interface controller's tasks are handled by the processor 940. In some implementations, the network interface controller 930 is part of the processor 940. In some implementations, a computing device 910 has multiple network interface controllers 930. In some implementations, the network interface 935 is a connection point for a physical network link, e.g., an RJ 45 connector. In some implementations, the network interface controller 930 supports wireless network connections via network interface port 935. Generally, a computing device 910 exchanges data with the other computing devices 920, via physical or wireless links to a network interface 935. In some implementations, the network interface controller 930 implements a network protocol such as LTE, TCP/IP Ethernet, IEEE 802.11, IEEE 802.16, or the like.

The other computing devices 920 can be connected to the computing device 910 via a network interface port 935. The other devices 970 can include an I/O interface 990, external serial device ports, and any additional co-processors. For example, computing system 910 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device 990 is incorporated into the computing system 910, e.g., a touch screen on a tablet device. In some implementations, a computing device 910 includes an additional device 970 such as a co-processor, e.g., a math co-processor that can assist the processor 940 with high precision or complex calculations.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and serially-arranged by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be serially-arranged by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
receiving, within a graphical user interface (GUI) of a borescope device, a selection of a first machine-readable inspection file comprising first data characterizing a first inspection template having one or more nodes corresponding to one or more first inspection points of a first inspection of an asset;
receiving, within the GUI, a selection of a second machine-readable inspection file comprising second data characterizing a second inspection template having one or more nodes corresponding to one or more second inspection points of a second inspection of the asset;
determining that the first inspection file and the second inspection file are compatible to be merged; and
generating a merged inspection folder, wherein the merged inspection folder comprises a, automatically, a merged inspection file, wherein the merged inspection file comprises comprising the first data and the second data.

2. The method of claim 1, further comprising:
receiving, within the GUI, a selection of a merge button; and
prompting, within the GUI, a user to select the first inspection file and the second inspection file.

3. The method of claim 1, further comprising:
determining whether the first inspection template matches the second inspection template;
generating the merged inspection file responsive to determining that the first inspection template matches the second inspection template; and
providing an error notification to the GUI responsive to determining that the first inspection template does not match the second inspection template.

4. The method of claim 1, wherein the first inspection file is stored within a first inspection folder comprising the first inspection file and one or more first files, each of the one or more files corresponding one of the one or more first inspection points, and the second inspection file is stored within a second inspection folder comprising the second inspection file and one or more second files, each of the one or more second files corresponding to one of the one or more second inspection points, the method further comprising:
generating a merged inspection folder, and wherein the merged inspection folder further comprises a merged inspection file, the one or more first files and the one or more second files.

5. The method of claim 4, wherein the one or more first files and the one or more second files comprise at least one of an image file, a video file and a text file.

6. The method of claim 4, further comprising:
determining whether one or more naming conflicts exist between a title of the one or more first files and a title of the one or more second files; and
responsive to determining that a naming conflict exists between the title of one or more of the first files and the title of the one or more of the second files, modifying the title of at least one of the one or more first files and the one or more second files to resolve the conflict.

7. The method of claim 4, wherein the first inspection folder further comprises a first inspection ID and the second inspection folder further comprises a second inspection ID, the method further comprising:
automatically naming the merged inspection folder based on the first inspection ID and the second inspection ID.

8. The method of claim 4, further comprising:
generating a merged inspection report, wherein the merged inspection report is a text-based file comprising the contents of the merged inspection folder; and
providing the merged inspection report to a user.

9. The method of claim 1, further comprising:
receiving, within the GUI, a selection of a third inspection file comprising third data characterizing a third inspection of the asset; and
determining that the third inspection file is compatible to be merged with the first inspection file and the second inspection file, wherein the merged inspection file further comprises the third data.

10. A inspection system comprising:
a user interface display (UI); and
a computing system communicatively coupled to the UI and including at least one data processor and a memory storing instructions which, when executed by the at least one processor, cause the at least one processor to perform operations comprising:
receiving, within a graphical user interface (GUI) of the UI, a selection of a first machine-readable inspection file comprising first data characterizing a first inspection template having one or more nodes corresponding to one or more first inspection points of a first inspection of an asset;
receiving, within the GUI, a selection of a second machine-readable inspection file comprising second data characterizing a second inspection template having one or more nodes corresponding to one or more second inspection points of a second inspection of the asset;
determining that the first inspection file and the second inspection file are compatible to be merged; and
generating a merged inspection folder, wherein the merged inspection folder comprises a merged inspection file, wherein the merged inspection file comprises comprising the first data and the second data.

11. The inspection system of claim 10, wherein the processor is further configured to perform operations comprising:
receiving, within the GUI, a selection of a merge button; and
prompting, within the GUI, a user to select the first inspection file and the second inspection file.

12. The inspection system of claim 10, wherein the processor is further configured to perform operations comprising:

determining whether the first inspection template matches the second inspection template;

generating the merged inspection file responsive to determining that the first inspection template matches the second inspection template; and providing an error notification to the GUI responsive to determining that the first inspection template does not match the second inspection template.

13. The inspection system of claim 10, wherein the first inspection file is stored within the memory in a first inspection folder comprising the first inspection file and one or more first files, each of the one or more files corresponding one of the one or more first inspection points, and the second inspection file is stored within the memory in a second inspection folder comprising the second inspection file and one or more second files, each of the one or more second files corresponding to one of the one or more second inspection points, and the processor is further configured to perform operations comprising:

generating a merged inspection folder, wherein the merged inspection folder further comprises a merged inspection file, the one or more first files and the one or more second files.

14. The inspection system of claim 13, wherein the one or more first files and the one or more second files comprise at least one of an image file, a video file and a text file.

15. The inspection system of claim 13, wherein the processor is further configured to perform operations comprising:

determining whether one or more naming conflicts exist between a title of the one or more first files and a title of the one or more second files; and responsive to determining that a naming conflict exists between the title of one or more of the first files and the title of the one or more of the second files, modifying the title of at least one of the one or more first files and the one or more second files to resolve the conflict.

16. The inspection system of claim 13, wherein the first inspection folder further comprises a first inspection ID and the second inspection folder further comprises a second inspection ID, and the processor is further configured to perform operations comprising:

automatically naming the merged inspection folder based on the first inspection ID and the second inspection ID.

17. The inspection system of claim 13, wherein the processor is further configured to perform operations comprising:

generating a merged inspection report, wherein the merged inspection report is a text-based file comprising the contents of the merged inspection folder; and providing the merged inspection report to a user.

18. The inspection system of claim 10, wherein the processor is further configured to perform operations comprising:

receiving, within the GUI, a selection of a third inspection file comprising third data characterizing a third inspection of the asset; and determining that the third inspection file is compatible to be merged with the first inspection file and the second inspection file, wherein the merged inspection file further comprises the third data.

\* \* \* \* \*